US011539608B2

(12) United States Patent
Chaudhry

(10) Patent No.: US 11,539,608 B2
(45) Date of Patent: *Dec. 27, 2022

(54) SYSTEMS AND METHODS FOR RESPONSIVE WEB PAGE DELIVERY BASED ON NETWORK BANDWIDTH

(71) Applicant: PayPal, Inc., San Jose, CA (US)

(72) Inventor: Seema Chaudhry, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 15/414,606

(22) Filed: Jan. 24, 2017

(65) Prior Publication Data

US 2017/0201445 A1 Jul. 13, 2017

Related U.S. Application Data

(63) Continuation of application No. 13/896,748, filed on May 17, 2013, now Pat. No. 9,552,438.

(51) Int. Cl.
*H04L 12/26* (2006.01)
*G06F 16/9535* (2019.01)
(Continued)

(52) U.S. Cl.
CPC ...... *H04L 43/0876* (2013.01); *G06F 16/9535* (2019.01); *G06F 16/9577* (2019.01)

(58) Field of Classification Search
CPC ........ G06F 17/30899–17/30905; G06F 3/048; G06F 16/957–16/9577; H04L 67/2828;
(Continued)

(56) References Cited

U.S. PATENT DOCUMENTS 6,185,625 B1 * 2/2001 Tso .................. G06F 17/30905
707/E17.121
6,341,304 B1 * 1/2002 Engbersen ........ G06F 17/30902
707/E17.12
(Continued)

FOREIGN PATENT DOCUMENTS

WO 2012101585 A1 * 8/2012 ......... G06F 16/9577

OTHER PUBLICATIONS

Electronics, Lessco. "How to List Items on Ebay like a pro Does." YouTube, YouTube, Feb. 2, 2012, www.youtube.com/watch?v=9lSzs14U7BM. (Year: 2012).*
(Continued)

*Primary Examiner* — Liang Y Li

(57) ABSTRACT

A system comprising a computer-readable storage medium storing at least one program, and a computer-implemented method for responsive web page delivery based on network bandwidth. Upon initiation of a network communication session, a bandwidth of a network connection of the client device involved in the network communication session is determined. At least one initial display element to provide as part of a webpage for display on the client device is selected based on the bandwidth of the network connection. Instructions are then provided to the client device which cause the client device to display the at least one display element. In some embodiments, an updated bandwidth is subsequently determined and updated display elements are selected based on the updated bandwidth.

20 Claims, 12 Drawing Sheets

(51) Int. Cl.
*G06F 16/957* (2019.01)
*H04L 43/0876* (2022.01)

(58) Field of Classification Search
CPC .................. H04L 43/0876–43/0894; H04L 67/32–67/327; H04L 51/06–066
See application file for complete search history.

(56) References Cited

U.S. PATENT DOCUMENTS

| | | | | |
|---|---|---|---|---|
| 9,009,251 | B1* | 4/2015 | Sanjeev | H04L 67/2823 709/217 |
| 2006/0210177 | A1* | 9/2006 | Murai | H04N 19/164 382/232 |
| 2007/0294333 | A1* | 12/2007 | Yang | H04L 67/02 709/203 |
| 2009/0044128 | A1* | 2/2009 | Baumgarten | G06F 16/9577 715/738 |
| 2009/0110158 | A1* | 4/2009 | Chen | G10L 19/0018 379/88.13 |
| 2010/0257572 | A1* | 10/2010 | Sridhar | H04N 21/6405 725/116 |
| 2011/0175914 | A1* | 7/2011 | Levanon | G06F 3/14 345/428 |
| 2012/0084661 | A1* | 4/2012 | Gil | G06Q 30/0251 715/738 |
| 2012/0192080 | A1* | 7/2012 | Lloyd | G06F 17/30905 715/744 |
| 2012/0254720 | A1* | 10/2012 | Hamm | G06F 16/957 715/234 |
| 2012/0307661 | A1* | 12/2012 | Oshiba | H04L 43/0882 370/252 |
| 2013/0031060 | A1* | 1/2013 | Lowery | G06F 16/9574 707/689 |
| 2014/0213256 | A1* | 7/2014 | Meylan | H04W 48/18 455/436 |
| 2014/0281133 | A1* | 9/2014 | Karamcheti | G06F 3/061 711/103 |

OTHER PUBLICATIONS

Weiss, Yoav. Jan. 9, 2013, Smashing Magazine. https://www.smashingmagazine.com/2013/01/bandwidth-media-queries-we-dont-need-em/ (Year: 2013).*

* cited by examiner

SYSTEMS AND METHODS FOR RESPONSIVE WEB PAGE DELIVERY BASED ON NETWORK BANDWIDTH

CROSS-REFERENCE TO RELATED APPLICATIONS

This application is a continuation of U.S. patent application Ser. No. 13/896,748, filed on May 17, 2013, now U.S. Pat. No. 9,552,438, issued Jan. 24, 2017; the disclosure of which is incorporated by reference herein.

TECHNICAL FIELD

Example embodiments of the present application generally relate to web page delivery and, more particularly in one embodiment, to a system and method for responsive web page delivery based on network connection bandwidth.

BACKGROUND

Current approaches in web page design focus on providing websites crafted to provide an optimal viewing experience across a range of different network devices (e.g., desktops, laptops, tablets, smart phones, etc.) used to access the Internet. Such approaches focus on presenting web sites in a manner that can be easily read on each type of device and navigated with a minimum amount of resizing, panning, scrolling or other user gestures. As such, a number of different designs for each web page may be created to deliver the optimal viewing experience to each different type of device.

Because these network devices are capable of accessing the Internet from nearly any location, users of these devices often access the Internet and view web pages in a mobile manner. For example, a user may begin a network session while in one physical location and the user may continue the session as they move to another location. This mobility causes devices to switch between different communication networks and access the internet over a variety of different network connections. Each of these networks and network connections have different attributes (e.g., network speed, signal strength, bandwidth, signal-to-noise ratio, etc.) affecting the delivery of web pages to the devices. In some instances, a network or network connection may limit the user's viewing experience of a particular web page due to the limited capabilities of the network or network connection.

BRIEF DESCRIPTION OF THE DRAWINGS

Some embodiments are illustrated by way of example and not limitation in the figures of the accompanying drawings in which.

DETAILED DESCRIPTION OF THE PREFERRED EMBODIMENTS

Figure 1:
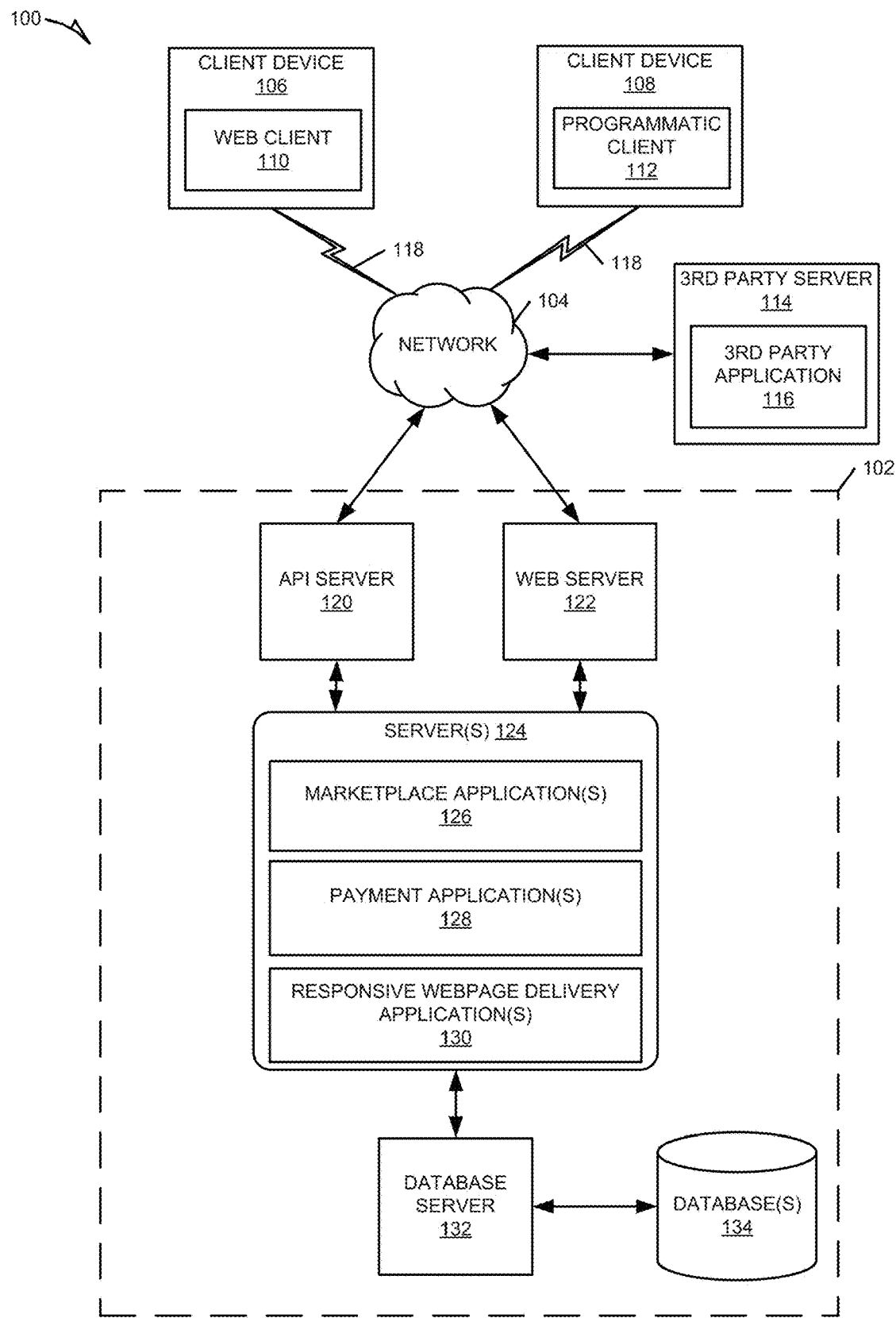
FIG. 1 is a network diagram depicting a network system having a client-server architecture configured for exchanging data over a network, according to an example embodiment.

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for web page delivery based on network bandwidth. Consistent with some embodiments, the system may monitor a network communication session of a client device (e.g., laptop, tablet, smartphone, etc.) and may measure the bandwidth of the network connection of the client device. In some embodiments, the bandwidth may be an exact value corresponding to available data communication resources of the network expressed in bits per second, or multiples thereof. In some embodiments, the measuring of the bandwidth may comprise determining that the bandwidth of the connection is within a range of bandwidth values corresponding to the available data communication resources of the network.

Consistent with some embodiments, one or more display elements to be displayed as part of a web page on the client device may be selected based on the measured bandwidth of the network connection. The selection of the display elements may be based on the amount of data communication resources necessary to properly deliver the display elements to the client device. For example, display elements requiring a low amount of resources for transmitting to the client device (e.g., text elements or low resolution images) may be selected for a low bandwidth connection. In some embodiments, the display elements are selected from a group of display elements assigned to the bandwidth range corresponding to the network connection. Each of the selected display elements may be presented on the client device.

In some embodiments, the system may continue to monitor the network communication session to determine updated bandwidth values at various predefined intervals throughout the session. For example, the system may determine the bandwidth of the network connection upon each server call (e.g., a click, swipe, gesture or other user interaction with the web page) or request from the client device. In some embodiments, the predefined intervals may depend on the type of service being used or invoked during the session.

In some embodiments, once an updated bandwidth value is determined, the system may select one or more additional or replacement display elements based on the updated bandwidth. Each additional or replacement display element is then transmitted for display on the client device. Additional display elements may be displayed in conjunction with previously selected display elements. In some embodiments, the replacement display elements are displayed such that each replaces a corresponding previously selected display element. In some embodiments, displaying the replacement elements simply causes the removal of one or more elements previously presented as part of the web page.

FIG. 1 is a network diagram depicting an example network system 100, according to one embodiment, having a client-server architecture configured for exchanging data over a network. For example, the network system 100 may be a network-based marketplace 102 where clients may communicate and exchange data within the network system 100. The data may pertain to various functions and aspects associated with the network system 100 and its users.

A data exchange platform, in an example form of a network-based marketplace 102, may provide server-side functionality, via a network 104 (e.g., the Internet), to one or more client devices. The one or more client devices may be operated by users that use the network system 100 to exchange data over the network 104. These transactions may include transmitting, receiving (communicating), and processing data to, from, and regarding content and users of the network system 100. The data may include, but are not limited to, images; video or audio content; user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the network-based marketplace 102 via a web server 122. The UIs may also be associated with a client device 108 using a programmatic client 112, such as a client application, or a third party server 114 (e.g., one or more servers or client devices) hosting a third party application 116. It can be appreciated that, in various embodiments, the client devices 106, 108, and/or the third party server 114 may be associated with a buyer, a seller, a third party electronic commerce platform, a payment service provider, or a shipping service provider, each in communication with the network-based marketplace 102 and optionally with each other. The buyers and sellers may be any one of individuals, merchants, or service providers, among other things.

The client devices 106 and 108 may be any of a variety of types of devices (e.g., a cellular telephone, a smart phone, a personal digital assistant (PDA), a personal navigation device (PND), a handheld computer, a tablet computer, a laptop computer, a desktop computer, a notebook computer, a wearable computing device such as glasses or a wristwatch, an multimedia device embedded in an automobile, a Global Positioning System (GPS) device, a data enabled book reader, or other type of movable device). The client devices 106 and 108 may interface via a connection 118 with a communication network 104 (e.g., the Internet or Wide Area Network (WAN)). Depending on the form of the client device 106 and 108, any of a variety of types of connections 118 and communication networks 104 may be used.

For example, the connection 118 may be Code Division Multiple Access (CDMA) connection, a Global System for Mobile communications (GSM) connection, or other type of cellular connection. Such a connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network.

In yet another example, the connection 118 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates a third party application 116 executing on a third party server 114 that may offer one or more services to users of the client devices 106 and 108. The third party application 116 may have programmatic access to the network-based marketplace 102 via the programmatic interface provided by an application program interface (API) server 120. In some embodiments, the third party application 116 may be associated with a vendor, a merchant, or any organizations that may conduct transactions with the users of the client devices 106 and 108. For some example embodiments, the third party application 116 may be associated with an online marketplace (e.g., eBay, Inc. of San Jose, Calif.).

Turning specifically to the networked-based marketplace 102, the API server 120 and a web server 122 are coupled to, and provide programmatic and web interfaces respectively to, one or more application servers 124. The application servers 124 host one or more marketplace application(s) 126, payment application(s) 128, and responsive web page delivery application(s) 130. The application servers 124 may be coupled via these interfaces to the communication network 104, for example, via wired or wireless interfaces. The application servers 124 are, in turn, shown to be coupled to one or more database server(s) 132 that facilitate access to one or more database(s) 134. In some examples, the application servers 124 can access the database(s) 134 directly without the need for a database server 132. In some embodiments, the databases 134 may include databases with internal and external to the network-based marketplace 102.

The marketplace applications 126 may provide a number of marketplace functions and services to users that access the network-based marketplace 102. The payment applications 128 may likewise provide a number of payment services and functions to users. The payment applications 128 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 126. For some example embodiments, payment applications 128 generally enable transfer of values (e.g., funds, reward points, etc.) from an account associated with one party (referred to as a sender) to another account associated with another party (referred to as a receiver). To perform the value transfer, execution of the payment applications 128 may be based on one or more approval flows. This may require having access or the rights to initiate these approval flows and to use the services of a payment facilitator. One example of a payment facilitator is PayPal, Inc. of San Jose, Calif. Having access may not include having approval to transfer the values out of the sender's account, while having approval may implicitly include having access.

The web page delivery applications 130 may provide a number of responsive web page delivery services to users that access the network system 100. For example, the web page delivery applications 130 may monitor the bandwidth of the connection 118 during a network communication session with the client device 106 and provide display elements selected based on the bandwidth to the client device 106.

While the marketplace, payment and web page delivery applications 126, 128, and 130 are shown in FIG. 1 to all form part of the network-based marketplace 102, it will be appreciated that, in alternative embodiments, the web page delivery applications 130 may form part of a service that is separate and distinct from the network-based marketplace 102. Further, while the system 100 shown in FIG. 1 employs a client-server architecture, the present invention is, of course, not limited to such an architecture, and could equally well find application in an event-driven, distributed, or peer-to-peer architecture system, for example. The various modules of the application servers 124 may also be implemented as standalone systems or software programs, which do not necessarily have networking capabilities.

Figure 2:
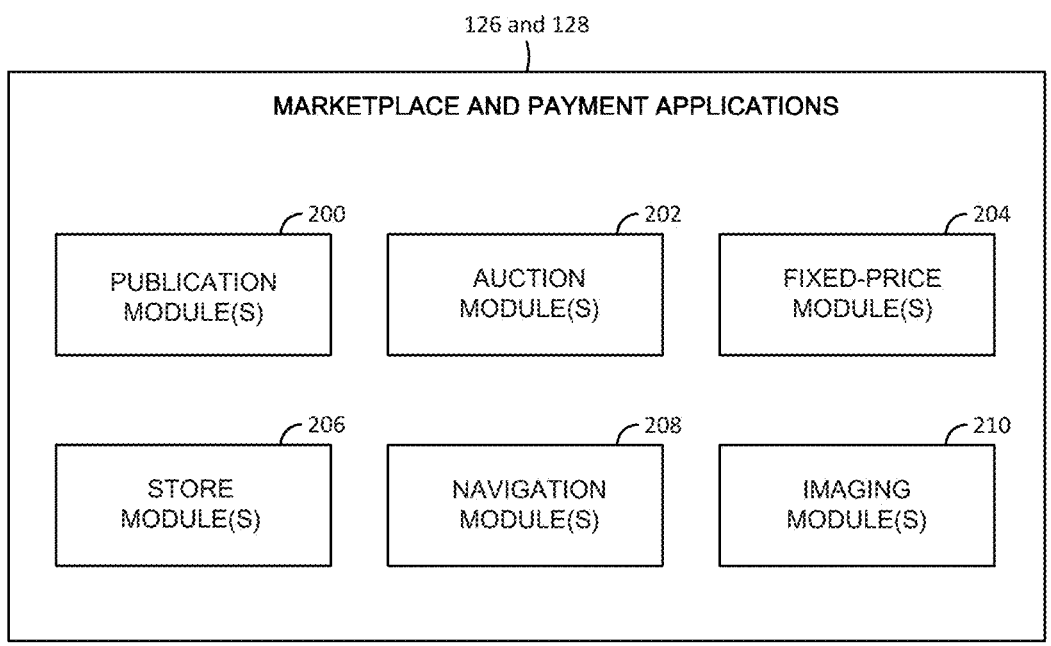
FIG. 2 is a block diagram illustrating an example embodiment of multiple marketplace and payment applications, which are provided as part of the network system.

FIG. 2 is a block diagram illustrating an example embodiment of multiple modules forming the marketplace and payment applications 126 and 128, which are provided as part of the network system 100. The modules of the marketplace and payment applications 126 and 128 may be hosted on dedicated or shared server machines (not shown) that are communicatively coupled to enable communications between server machines. Each of the modules 200-210 are communicatively coupled (e.g., via appropriate interfaces) to each other and to various data sources, so as to allow information to be passed between the modules 200-210 of the marketplace and payment applications 126 and 128 or so as to allow the modules 200-210 to share and access common data. The various modules of the marketplace and payment applications 126 and 128 may furthermore access one or more databases 134 via the database servers 132.

The marketplace and payment applications 126 and 128 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 126 and 128 are shown to include at least one publication module 200 and one or more auction modules 202, which support auction-format listing and price setting mechanisms (e.g., English, Dutch, Vickrey, Chinese, Double, Reverse auctions etc.). The various auction modules 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store modules 206 may allow sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based marketplace 102 may be facilitated by one or more navigation modules 208. For example, a search module may, inter alia, enable key word searches of listings published via the marketplace 102. A browser module may allow users via an associated UI to browse various category, catalogue, inventory, social network, and review data structures within the marketplace 102. Various other navigation modules 208 (e.g., an external search engine) may be provided to supplement the search and browsing modules.

In order to make listings, available via the network-based marketplace 102, as visually informing and attractive as possible, the marketplace and payment applications 126 and 128 may include one or more imaging modules 210, which users may utilize to upload images, videos, or other display elements for inclusion within listings. An imaging module 210 also operates to incorporate images, videos, and other display elements within viewed listings. The imaging modules 210 may also support one or more promotional features, such as image galleries that are presented to potential buyers. For example, sellers may pay an additional fee to have an image included within a gallery of images for promoted items.

Figure 3:
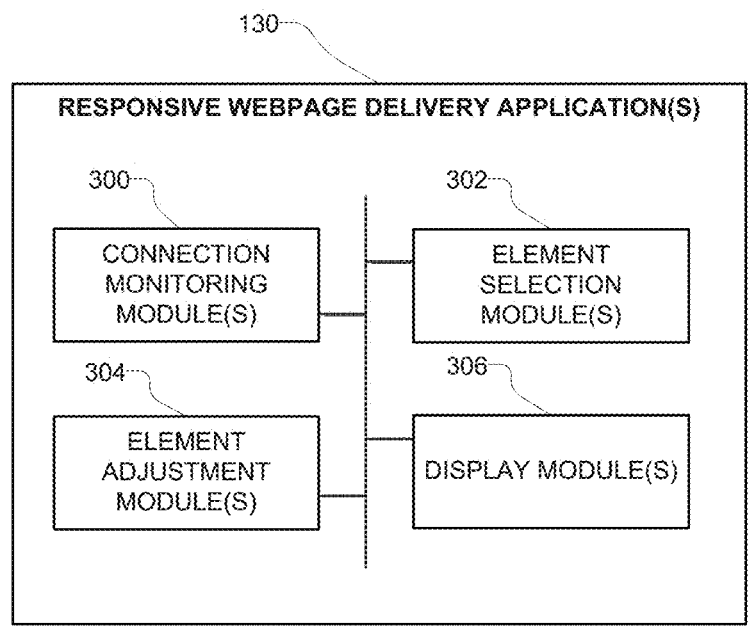
FIG. 3 is a block diagram illustrating an example embodiment of multiple modules forming responsive web page display applications, which are provided as part of the network system.

FIG. 3 is a block diagram illustrating an example embodiment of multiple modules forming the responsive webpage delivery applications 130, which are provided as part of the network system 100. The modules of the responsive webpage delivery applications 130 may be hosted on dedicated or shared server machines (not shown) that are communicatively coupled to enable communications between server machines. Each of the modules 300-306 are communicatively coupled (e.g., via appropriate interfaces) to each other and to various data sources, so as to allow information to be passed between the modules 300-306 of the responsive webpage delivery applications 130 or so as to allow the modules 300-306 to share and access common data. The various modules of the responsive webpage delivery applications 130 may furthermore access one or more databases 134 via the database servers 132.

As illustrated in FIG. 3, responsive webpage delivery applications 130 may include one or more connection monitoring modules 300, which may be a hardware implemented module or software executed by general purpose or special purpose hardware or instructions stored on a computer readable medium that is operative to monitor a connection (e.g., connection 118) of a client device (e.g., client device 106) during an network communication session. The network communication session may be any interactive communication exchange between the client device 106 and another network device (e.g. application server 124) involving the utilization of one or more web based services. In some embodiments, the network communication session may involve the display of a website including one or more web pages. Each web page of a particular website may have a particular design for each type of device that may access the website. Each web page may include one or more display elements. A display element may be, for example, text, a text box, a window or frame, an advertisement banner, an image, a video, or other dynamic content elements.

Consistent with some embodiments, a network communication session may include utilization of the features of the network system 100 during a network session of a client device 106 with the network-based marketplace 102. For example, a network communication session may include navigation of the network-based marketplace 102 facilitated by the navigation modules 208.

The connection monitoring modules 300 may monitor the network session and may measure and determine the bandwidth (e.g., speed) of the connection 118 of the client device 106 to the communication network 104. For purposes of this disclosure, the bandwidth of the connection 118 may refer to a network bandwidth, a data bandwidth, a digital bandwidth, a bandwidth capacity, a maximum network throughput, or a total bandwidth consumption.

In some embodiments, the measured bandwidth may be an exact value corresponding to the available data communication resources of the network expressed in bits per second, or multiples thereof. In some embodiments, the measuring of the bandwidth may include determining that the bandwidth of the connection is within a range of bandwidth values corresponding to the available data communication resources of the network.

In some embodiments, determining the bandwidth of the network connection may include measuring the latency of the connection 118 of the client device 106 to the communication network 104 and/or the web server 122. The latency of the connection 118 refers to the time delay observed as data transmits from one networked device to another (e.g., from the client device 106 to the web server 122). Consistent with some embodiments, the latency of the connection 118 may be a one-way measurement of the time that a packet of data is transmitted from a source device (e.g., client device 106) until the data packed is received by the destination device (e.g., web server 122). In other embodiments, the latency of the connection 118 may be a round-trip measurement of the time that a packet of data is transmitted from a source to device (e.g., client device 106) to a destination device (e.g., web server 122) and back to the source device.

In some embodiments, determining the bandwidth of the connection 118 may involve measuring a load on the API server 120, the web server 122, or the application server 124. The "load" refers to an amount of computational work that each of these servers 120-124 is performing, respectively. In some embodiments, determining the bandwidth of the connection 118 may involve measuring the strength of the connection 118 or a signal-to-noise ratio of the connection 118.

The connection monitoring module 300 may determine the bandwidth of the connection 118 of the client device 106 to the communication network 104 upon initiation of the network communication session by a user of the client device 106. In some embodiments, the connection monitor module 300 may continue to monitor the network communication session to determine updated bandwidth values at various predefined intervals throughout the session. For example, the connection monitor module 300 may determine the bandwidth of the network connection 118 upon each server call (e.g., a click, swipe, gesture or other user interaction with the web page) or request from the client device 106. The predefined intervals may depend on the type of service being used or invoked during the network communication session. For example, the communication monitor module 300 may determine updated bandwidth values at more frequent intervals for communication sessions involving a video streaming service and at less frequent intervals for communication session involving presentation of simple text based news articles. In some embodiments, the predefined intervals may be based on user preferences.

As illustrated in FIG. 3, the responsive webpage delivery applications 130 may include one or more element selection modules 302, which may be a hardware implemented module or software executed by general purpose or special purpose hardware or instructions stored on a computer readable medium that is operative to select one or more display elements based on the bandwidth of the network connection 118. The element selection modules 302 may select the one or more display elements based on the bandwidth determined at the initiation of the network session or a subsequent updated bandwidth measured throughout the network session. Each web page may have a number of different available display elements intended to be displayed as part of the web page. In some embodiments, the available display elements may be images, videos, or other display elements uploaded by a user to the imaging module 210. The number and type of display elements to be displayed on a particular web page may depend on the device being used to access the web page.

Each display element may require a certain amount of data communication resources in order for the display element to be properly transmitted to and displayed on the client device 106. In some embodiments, the element selection module 302 may select only those elements which the network connection 118 is capable of transmitting and displaying on the client device 106. To this end, the element selection modules 302 may be configured to dynamically determine the amount of resources or network bandwidth necessary for the transmission and display of each of the display elements. Once the necessary bandwidth for each available display element has been determined, the element selection modules 302 may compare the necessary bandwidth for each element with the bandwidth of the network connection 118. The element selection module 302 may then select one or more elements having a necessary bandwidth less than that of the bandwidth of the network connection 118.

In some embodiments, the element selection module 302 may determine the amount of resources or network bandwidth necessary for the transmission and display of each of the display elements. The determination may be made upon initial publication of each web page. Each display element may then be assigned to a particular bandwidth category or range of bandwidth values. For example, video content or high resolution images may be classified as "Heavy Elements" and may be assigned to a range of values corresponding to the highest bandwidth range. In another example, text elements or low resolution images may be classified as "Light Elements" and may be assigned to a range of values corresponding to the lowest bandwidth range. In some embodiments, the element selection module 302 may automatically assign each display element to a bandwidth range. In other embodiments, assigning each display element to a bandwidth range may involve a selection by the user, a control mechanism in the user device, an application configured on the user device, a service provider application running on a server or in a cloud network configuration, or as initiated by the service provider. Consistent with this embodiment, the element selection module 302 may use the measured bandwidth of the connection 118 to select elements assigned to the corresponding bandwidth range.

Consistent with some embodiments, the element selection modules 302 may select one or more replacement display elements to replace previously selected display elements or one or more additional display elements to display in conjunction with previously selected display elements. The replacement display elements may be selected based on an updated bandwidth value determined by the connection monitor module 300 subsequent to an initial bandwidth value being determined. The element selection modules 302 may select replacement display elements in accordance with one or more of the techniques described herein.

In some embodiments, the element selection module 302 may determine that each of the available display elements require a greater bandwidth than is available. The responsive webpage delivery applications 130 may thus include one or more element adjustment modules 304, which may be a hardware implemented module or software executed by general purpose or special purpose hardware or instructions stored on a computer readable medium that is operative to adjust, modify, translate, or convert one or more of the display elements so as to reduce the bandwidth necessary for transmission or display of these elements. For example, the element adjustment modules 304 may convert a high resolution image to a low resolution image. In another example, the element adjustment module 304 may capture a single frame of a video to display in place of the video.

As illustrated in FIG. 3, the responsive webpage delivery application 130 may include one or more display modules 306. The display module 306 may be a hardware implemented module or software executed by general purpose or special purpose hardware or instructions stored on a computer readable medium that is operative to control information or data that is provided to client systems for display on client device 106. The display module 306 may be configured to present web pages, user interfaces, and other information retrieved from the database 134. In some embodiments, the presentation of webpages includes presentation of display elements selected by the element selection modules 302 to the client device 106. The display modules 306 may transmit instructions to the client device 106 which cause the client device 106 to present the web pages and accompanying selected display elements.

It will be appreciated that one or more of the various example modules of the responsive webpage delivery applications 130 may be combined into a single module. Further, in some embodiments, the one or more modules may be omitted and additional modules may also be included. Additionally, while the modules of FIG. 3 are discussed in the plural sense, it is noted that a single version of the module may be utilized.

Figure 4:
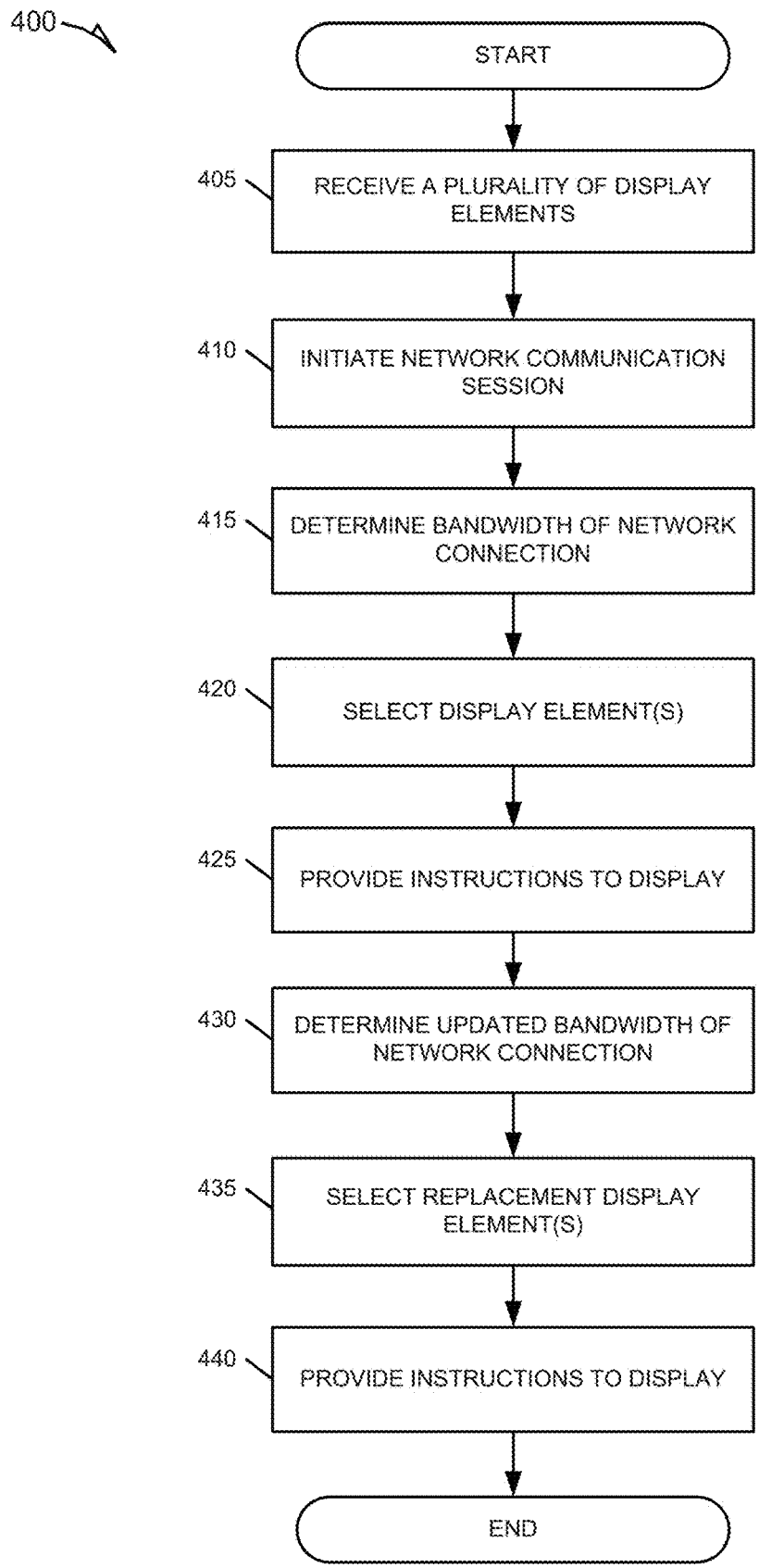
FIG. 4 is a flowchart illustrating an example method of providing responsive web page delivery based on network bandwidth.

FIG. 4 is a flowchart illustrating an example method 400 of providing responsive web page delivery based on network bandwidth. In this example, the method 400 may include operations such as receiving a plurality of display elements at operation 405, initiating a network communication session at operation 410, determining bandwidth of the network connection at operation 415, selecting display element(s) at operation 420, providing instructions to display the selected display elements at operation 425, determining an updated bandwidth of the network connection at operation 430, selecting replacement display elements at operation 435, and providing instructions to display the replacement display elements at operation 440.

At operation 405, a plurality of display elements are received. The plurality of display elements may comprise a portion of one or more webpages or user interfaces. In some embodiments, the plurality of display elements is comprised of every element in a webpage or user interface. In some embodiments, the plurality of display elements may be received by the imaging module 210 from a user for publishing as part of one or more webpages. In some embodiments, the plurality of display elements may be received from one or more applications running on the application server 124 or the third party server 114. In some embodiments, the plurality of display elements is retrieved from a repository of display elements such as database 134.

At operation 410, a network communication session is established with a client device (e.g., client device 106). The network communication session may include an exchange of information or data between the client device 106 and another network device (e.g., application server 124). For example, the network communication session may involve browsing webpages, streaming audio or video content, publishing content, bidding on items offered for sale in an online auction, purchasing items offered for sale by an online merchant, text-based (e.g., instant message (IM)) communications, sending and receiving email, presentation of advertisements, and the like.

At operation 415, the bandwidth of the connection to the client device 106 is determined. The determining of the bandwidth of the connection may, for example, include measuring the latency of the connection 118 between the client device 106 and the server hosting the session, measuring the network throughput, measuring the signal strength of the network connection 118, and measuring the signal-to-noise ratio of the network connection 118.

At operation 420, one or more initial display elements are selected from the plurality of display elements received at operation 405 based on the bandwidth measured at operation 415. The one or more initial display elements may be provided as part of a webpage or may comprise the entire webpage. Further details of operation 420 are discussed below in reference to FIG. 5 and FIG. 6.

At operation 425, the client device 106 is provided with instructions which cause the client device 106 to display the one or more initial display elements. The displaying of the one or more initial display elements may include displaying a webpage comprised of the one or more initial display elements.

At operation 430, an updated bandwidth of the connection 118 is determined. The network connection 118 to the client device 106 may be monitored throughout the pendency of the network communication session and an updated bandwidth may be determined at predetermined intervals throughout. The updated bandwidth may be determined according the techniques described herein in reference to operation 415. The predetermined intervals may be based on the activities or services involved in the network communication session. In some embodiments, the predetermined intervals may be based on user preferences or settings.

At operation 435, one or more updated display elements are selected. In some embodiments, the one or more updated display elements are replacement display elements to replace the display elements selected at operation 420. In some embodiments, the one or more updated display elements are additional display elements to display in conjunction with the display elements selected at operation 420. The selection of one or more updated display elements may include removing one or more display elements selected at operation 420. The selection of the one or more updated display elements may be performed in accordance with the techniques described in reference to operation 420 or in reference to FIG. 5 and FIG. 6 below. In some embodiments, the selection of one or more updated display elements may involve adjusting, modifying, converting, or translating one or more previously selected display elements selected at operation 420.

At operation 440, the client device 106 is provided with instructions which cause the client device 106 to display the one or more updated display elements. The method 400 may return to operation 430 and repeat each of the subsequent operations until the network communication session is no longer active.

Figure 5:
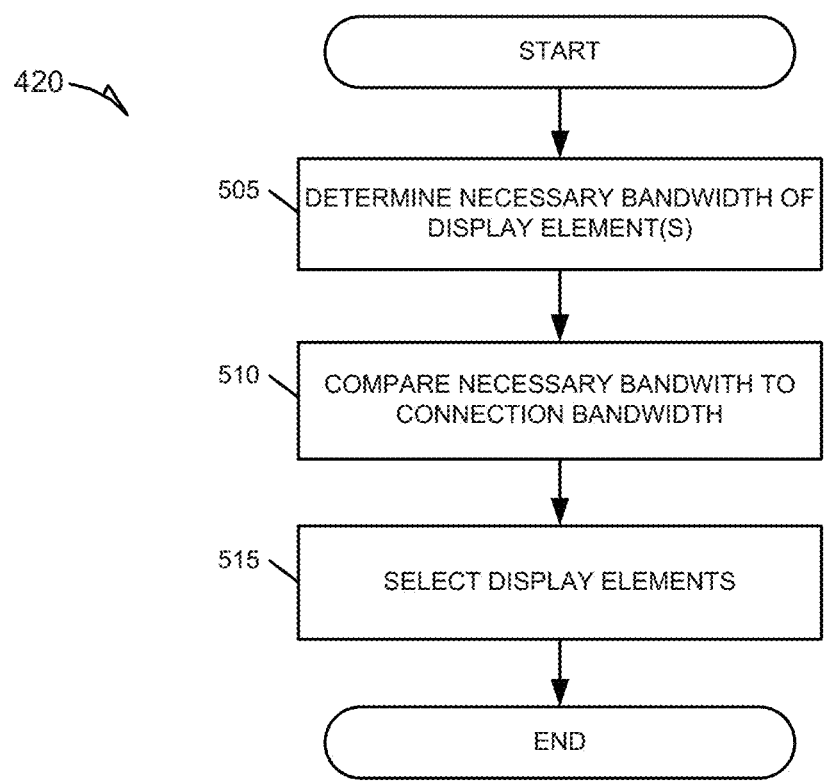
FIG. 5 is a flowchart illustrating an example method of selecting display elements based on network bandwidth.

FIG. 5 is a flowchart illustrating an example method of operation 420 of selecting display elements based on network bandwidth. In this example, the operation 420 may include operations such as determining the necessary bandwidth of display elements at operation 505, comparing necessary bandwidth with bandwidth of the network connection at operation 510, and selecting display elements at operation 515.

At operation 505, the bandwidth necessary to display each display element is determined. In some embodiments, the necessary bandwidth for each of the plurality of display elements received at operation 405 may be determined upon receipt. In some embodiments, the necessary bandwidth for display elements is determined upon receiving a request to view or a call from the corresponding webpage. The necessary bandwidth may be the amount of data communication resources necessary to transmit and display the display element. In some embodiments, the necessary bandwidth of a particular element is a function of the display element size (expressed in bytes or bites).

At operation 510, the necessary bandwidth for each display element is compared to the bandwidth of the connection. Based on the comparison, one or more display elements having a necessary bandwidth less than the bandwidth of the connection may be selected at operation 515.

Figure 6:
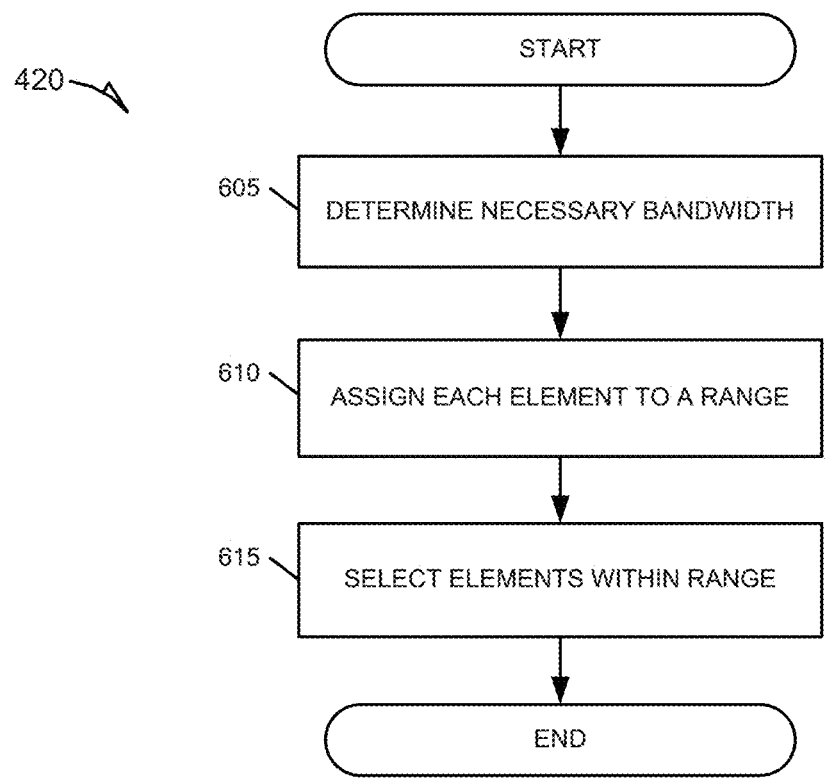
FIG. 6 is a flowchart illustrating an example method of selecting display elements based on network bandwidth.

FIG. 6 is a flowchart illustrating an example method of operation 420 of selecting display elements based on network bandwidth. In this example, the operation 420 may include operations such as determining the necessary bandwidth of display elements at operation 605, assigning each display element to a bandwidth range based on the necessary bandwidth at operation 610, and selecting display elements within the range of the bandwidth of the connection 118 at operation 615.

At operation 605, the bandwidth necessary to display each display element is determined. In some embodiments, the necessary bandwidth for each of the plurality of display elements received at operation 405 may be determined upon receipt. In some embodiments, the necessary bandwidth for display elements is determined upon receiving a request to view or a call from the corresponding webpage. The necessary bandwidth may be the amount of data communication resources necessary to transmit and display the display element. In some embodiments, the necessary bandwidth of a particular element is a function of the display element size (expressed in bytes or bites).

At operation 610, each of the plurality of display elements may be assigned to a range of bandwidth values based on the necessary bandwidth of the respective display element. For example, the system may designate a "low bandwidth range," a "moderate bandwidth range," and a "high bandwidth range." Each range may be defined by a lower bound and upper bound, with the upper and lower bounds corresponding to a bandwidth value. For example, the "low bandwidth range" may be defined by the bandwidth range from 0.0 kbps-128 kbps; the "moderate bandwidth range" may be defined by the bandwidth range from 128.1 kbps-1.5 Mbps; and the "upper bandwidth range" may be defined by the bandwidth range from 1.51 Mbps-247 Mbps. Each of the plurality of display elements may be assigned to the range corresponding to the determined necessary bandwidth of that element. It should be appreciated that the ranges presented above are merely exemplary and that the granularity of bandwidth scale and the number of bandwidth ranges may vary between different embodiments.

At operation 615, one or more display elements are selected from the range corresponding to the bandwidth of the network connection 118. Following the example from above, if the bandwidth of the connection 118 is determined to be within the range 1.51 Mbps-247 Mbps, one or more display elements assigned to the "upper bandwidth range" may be selected for display.

Figure 7:
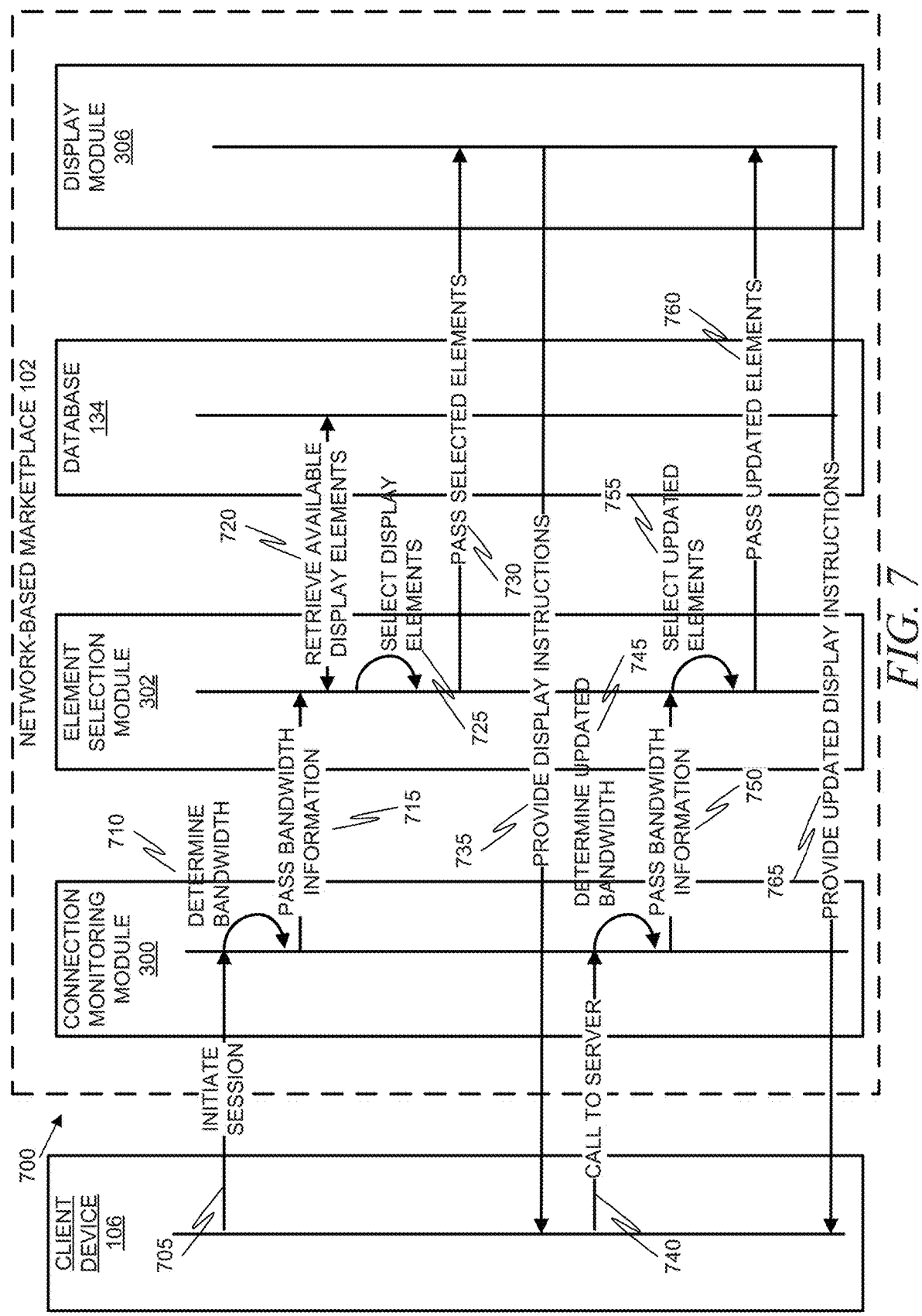
FIG. 7 is an interaction diagram illustrating an example method of providing responsive web page delivery based on network bandwidth.

FIG. 7 is an interaction diagram illustrating an example method of providing responsive web page delivery based on network bandwidth. In particular, FIG. 7 illustrates interactions between various components of the network system 100, according to an example embodiment. Specifically, FIG. 7 illustrates interactions of the client device 106, the connection monitoring module 300, the element selection module 302, database 134, and the display module 306.

At operation 705, the client device 106 initiates a network communication session with the network-based marketplace 102. In some embodiments, the network communication session may be an electronic commerce session including general navigation of the network-based marketplace 102, searching for products offered for sale, viewing item listings offered by online merchants, adding items to an electronic shopping cart, and purchasing items added to the electronic shopping cart. Upon initiation of the network communication session, the connection monitoring module 300 may begin monitoring the connection 118 of the client device 106 to the communication network 104.

At operation 710, the connection monitoring module 330 may determine a bandwidth of the connection 118 to the client device 106. In some embodiments, the connection monitor module 330 may determine that the bandwidth of the connection 118 is within a particular range of bandwidth values. At operation 715, the connection monitorung module 300 may provide the bandwidth information to the element selection module 302.

At operation 720, the element selection module 302 may retrieve a plurality of available display elements stored in database 134. The plurality of available display elements may relate to the current state of the network communication session or in some embodiments may relate to potential future states of the network communication session.

At operation 725, the element selection module 302 may select at least one initial display element based on the bandwidth of the connection 118 determined at operation 710 by the connection monitoring module 300. The selecting of the at least one initial display element may be in accordance with the methods described in reference to FIG. 5 and FIG. 6.

At operation 730, the element selection module 302 may provide the display module 306 with the initial display elements. The display module 306 may subsequently transmit instructions to the client device 106 at operation 735, which may cause the client device 106 to display the selected elements (not shown). The display elements may be presented as part of a webpage, series of webpages, or a user interface.

At operation 740, the network-based marketplace 102 may receive a call or request from the client device 106. The call or request may be received at the application server 124. Upon receiving the call from the client device 106, the connection monitor module 300 may determine an updated bandwidth of the connection 118 at operation 745. At operation 750, the connection monitoring module 300 may provide the element selection module 302 with the updated bandwidth information.

At operation 755, the element selection module 302 may select updated elements based on the updated bandwidth value. In some embodiments, the selection of updated display elements may include selection of one or more replacement display elements to replace the initial display elements. In some embodiments, the element selection module 302 may work in conjunction with the element adjustment module 304 (not shown) to adjust one or more of the initial display elements to serve as replacement display elements. In some embodiments, the updated display elements may be additional display elements to be displayed in conjunction with the initial display elements.

At operation 760, the element selection module 302 may provide the updated display elements to the display module 306. At operation 765, the display module 306 may provide the client device 106 instructions which cause the client device 106 to display the updated display elements. Depending on the form of the updated display elements, the instructions may cause the client device 106 to remove or replace the initial display elements or to display the updated display elements in conjunction with the initial display elements.

Example User Interface

Figure 8A:
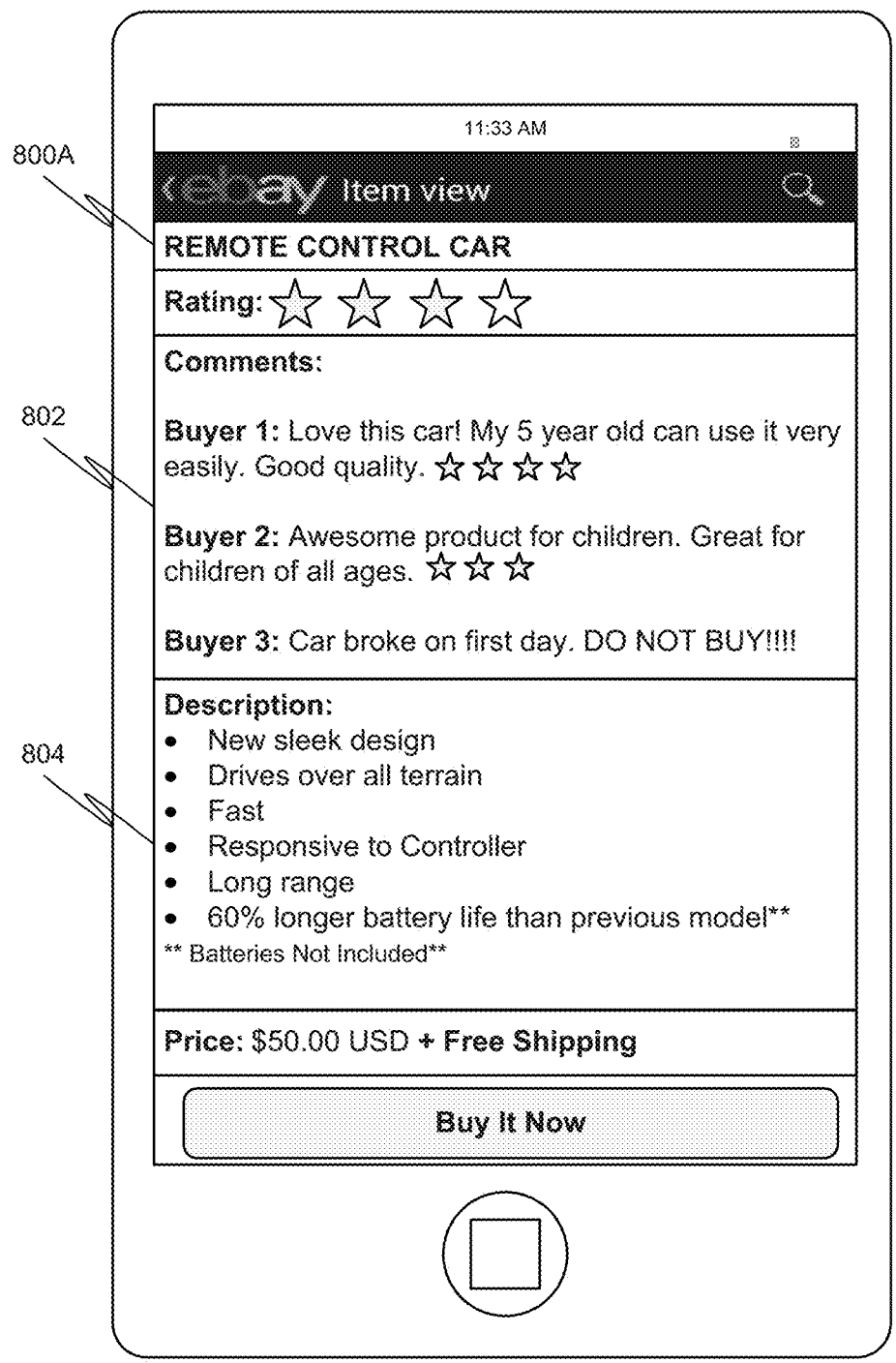
FIG. 8A is an interface diagram illustrating an example web page with multiple display elements delivered to a client device, according to an example embodiment.

FIG. 8A is an interface diagram illustrating an example web page 800A with multiple display elements delivered to a client device 106, according to an example embodiment. As illustrated in FIG. 8A, the web page 800A may be presented to a user on the display of a client device (e.g., client device 106). In this example, the web page 800A is a product description page corresponding to an item offered for sale on the network-based marketplace 102.

Consistent with this embodiment, upon initiation of a network communication session between the client device 106 and network-based marketplace 102, the connection monitoring module 300 may determine that the bandwidth of the connection 118 is low. As illustrated in FIG. 8A, display elements 802 and 804 are text-based elements requiring a low amount of network resources making display elements 802 and 804 suitable for the low bandwidth connection 118. As such, the display elements 802 and 804 may be selected for display on the client device 106 based on the low bandwidth.

Figure 8B:
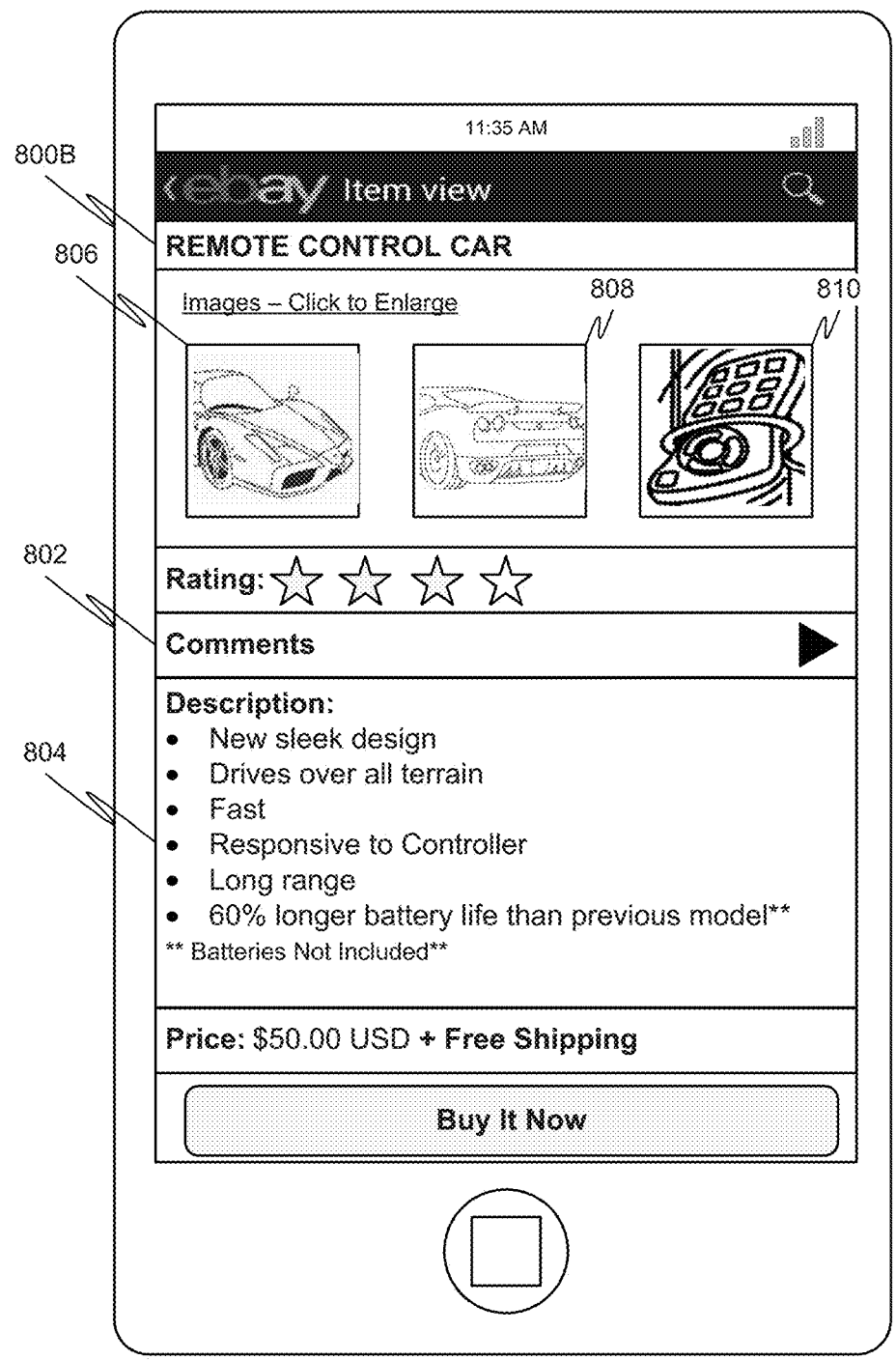
FIG. 8B is an interface diagram illustrating an example web page with multiple updated display elements delivered to a client device, according to an example embodiment.

FIG. 8B is an interface diagram illustrating an example web page 800B with multiple updated display elements delivered to a client device 106, according to an example embodiment. The web page 800B is the product description page illustrated in FIG. 8A with additional display elements 806, 808, and 810. As illustrated in FIG. 8B, the display elements 806, 808, and 810 are displayed in conjunction with display elements 802 and 804. In this example embodiment, the display element 802 has been updated to make room for the larger and more graphically rich display elements 806, 808, and 810.

As illustrated in FIG. 8B, the display elements 806, 808, and 810 are image content that may require a greater amount of network resources to display than the simple text-based display elements 802 and 804. As such, the display elements 806, 808, and 810 may be selected for display in response to measuring an updated bandwidth of the connection 118 that is greater than the bandwidth measured in FIG. 8A. In some embodiments, the updated bandwidth may be determined in response to a user interaction (e.g., click, swipe, or other gesture) with the web page 800A. In some embodiments, the updated bandwidth may be measured at a predefined time interval.

Figure 8C:
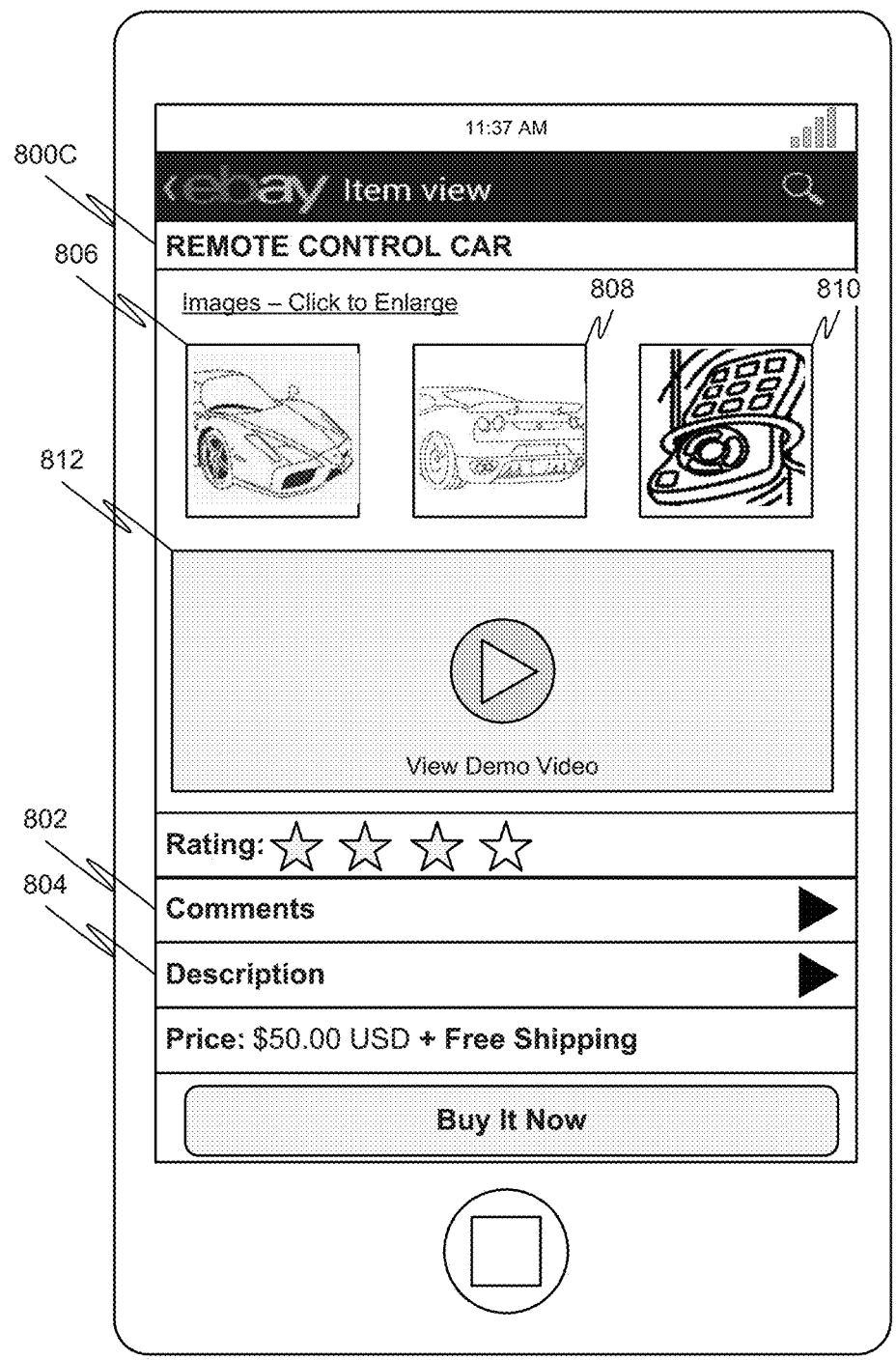
FIG. 8C is an interface diagram illustrating an example web page with additional updated display elements delivered to a client device, according to an example embodiment.

FIG. 8C is an interface diagram illustrating an example web page 800C with an additional updated display elements delivered to a client device 106, according to an example embodiment. The web page 800C is the product description page illustrated in FIG. 8B with additional display element 812. As illustrated in FIG. 8C, the display element 812 is displayed in conjunction with display elements 802-810. In this example embodiment, the display element 804 has updated to make room for display element 812.

As illustrated in FIG. 8C, the display element 812 is a video that may require a greater amount of network resources to display than the simple text-based display elements 802 and 804 and the images 806-810. As such, display element 812 may be selected for display in response to measuring an updated bandwidth that is greater than the bandwidth measured in FIG. 8B.

Example Client Device

Figure 9:
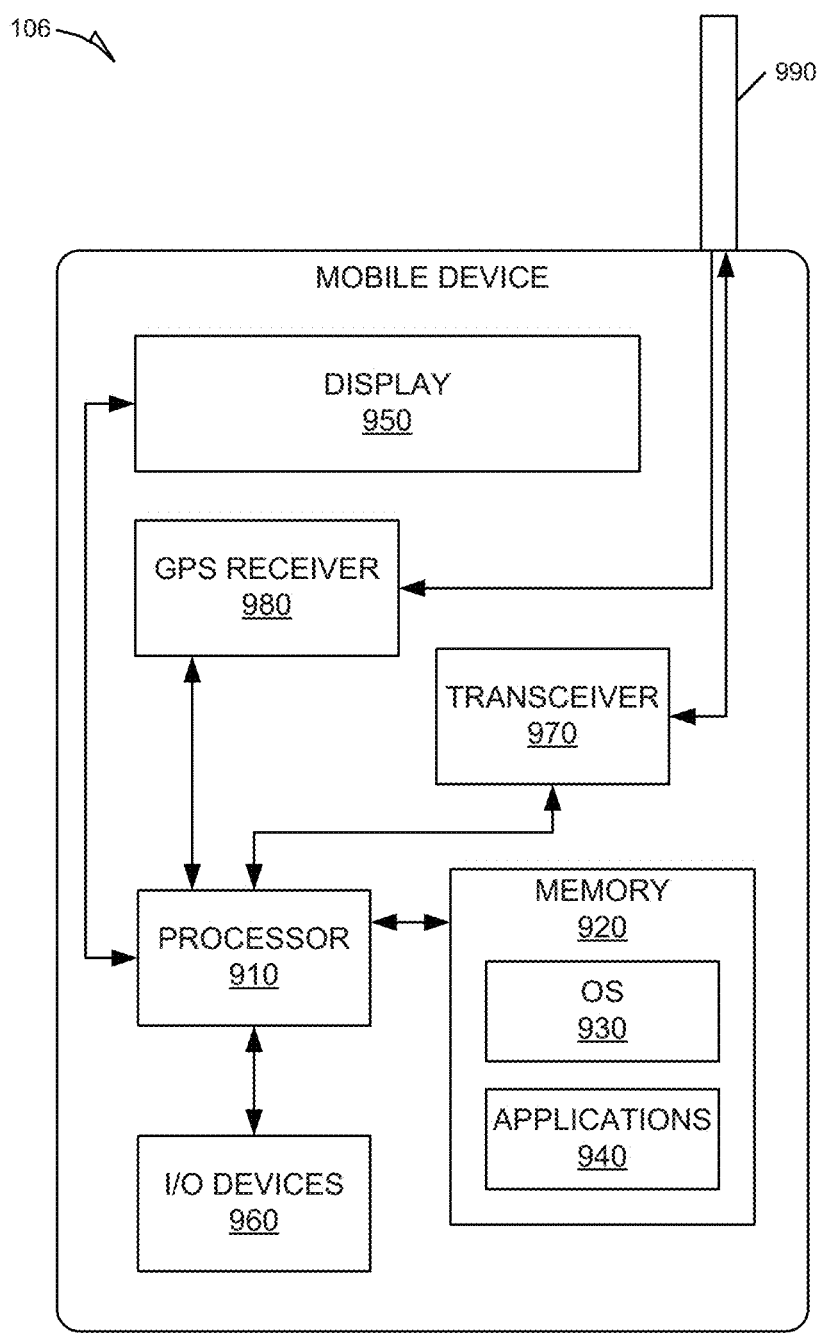
FIG. 9 is a block diagram illustrating a mobile device, according to an example embodiment.

FIG. 9 is a block diagram illustrating a client device 106, such as a mobile device, according to an example embodiment. The client device 106 may include a processor 910. The processor 910 may be any of a variety of different types of commercially available processors suitable for mobile devices (e.g., an XScale architecture microprocessor, a Microprocessor without Interlocked Pipeline Stages (MIPS) architecture processor, or another type of processor). A memory 920, such as a random access memory (RAM), a Flash memory, or other type of memory, is typically accessible to the processor 910. The memory 920 may be adapted to store an operating system (OS) 930, as well as application programs 940, such as a mobile location enabled application that may provide location based services (e.g., physical location check-in) to a user. The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the client device 106. In this manner, the connection 118 with the network 104 may be established. Further, in some configurations, a GPS receiver 980 may also make use of the antenna 990 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
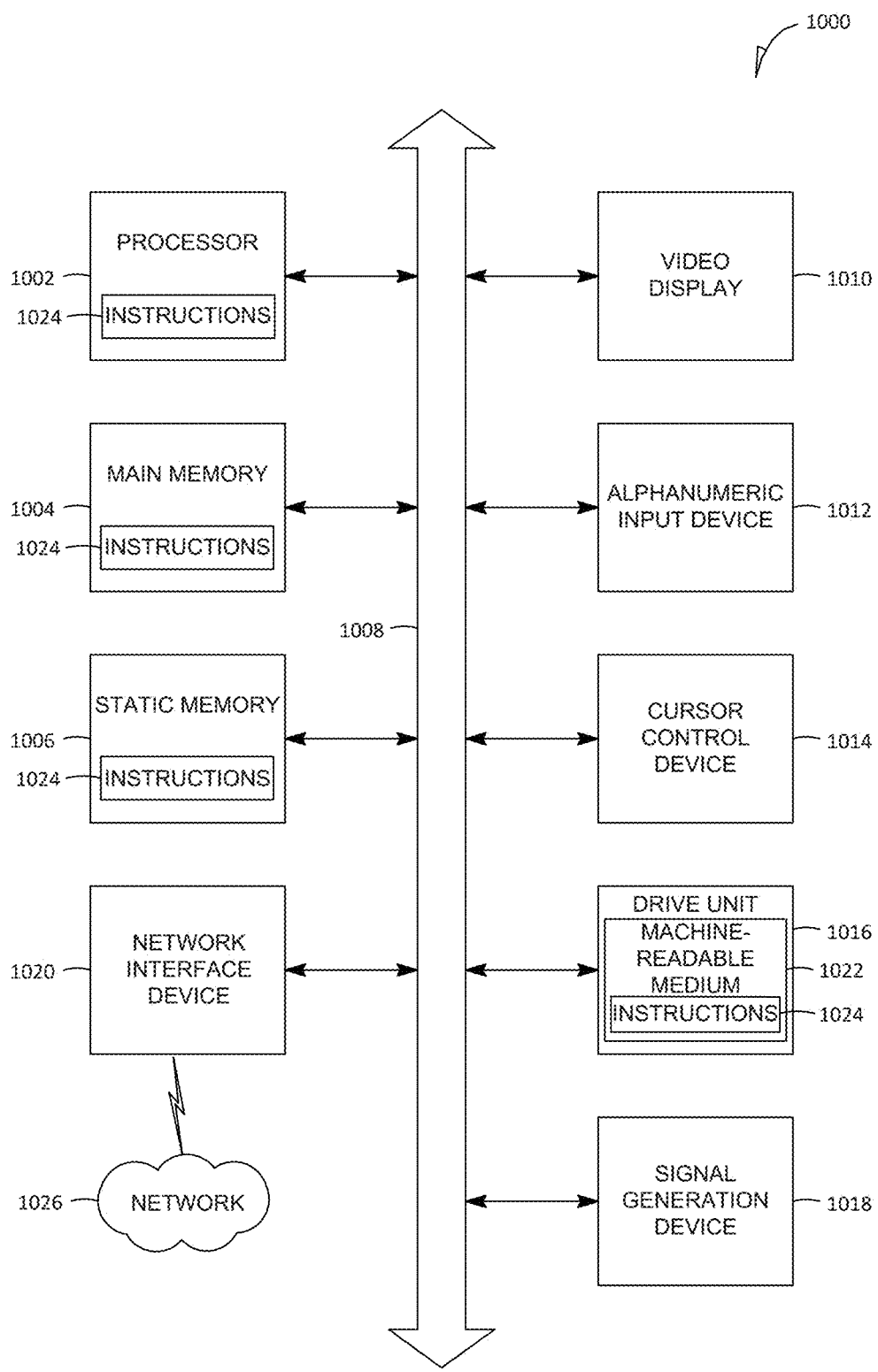
FIG. 10 is a diagrammatic representation of a machine in the example form of a computer system within which a set of instructions for causing the machine to perform any one or more of the methodologies discussed herein may be executed.

FIG. 10 is a block diagram of machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a UI cursor control device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or used by any one or more of the methodologies or functions described herein. The instructions 1024 may also reside, completely or at least partially, within the main memory 1004, static memory 1006, and/or within the processor 1002 during execution thereof by the computer system 1000, with the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more data structures or instructions 1024. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for providing replacement of image content for a web page based on changing bandwidth, comprising:
a processor; and
a computer-readable medium having instructions stored thereon that are executable to cause the system to perform operations comprising:
receiving a non-animated image for display on a web page via a web client operating at an end-user device;
receiving a web page request from a first user device for a web page, the web page including the non-animated image;
in response to receiving the web page request:
determining a first bandwidth of a communication path to the first user device; and
determining a necessary bandwidth associated with transmission of the non-animated image as a function of the display size of the non-animated image; and
determining, based on comparing the determined first bandwidth and the necessary bandwidth, that the non-animated image requires a greater bandwidth than is available;
in response to determining that the non-animated image requires a greater bandwidth than is available, assigning respective transmissions of a plurality of lower quality versions of the non-animated image to one or more bandwidth ranges of a plurality of bandwidth ranges for transmission to user devices for display, wherein respective ones of the plurality of bandwidth ranges comprise an upper and a lower bound;
selecting, based on comparing the first bandwidth of the communication path with the plurality of bandwidth ranges, the transmission of one of the plurality of lower quality versions of the non-animated image for the web page;
transmitting display elements to display the web page to the first user device, the display elements including the transmission of the selected lower quality version of the non-animated image;
determining, in response to a user interaction with the web page corresponding to a physical action taken via a user interface of the first user device, that the bandwidth availability of the communication path to the first user device has increased; and
in response to determining that the bandwidth availability has increased, transmitting a higher quality version of the non-animated image to the first user device for display in place of the lower quality version of the non-animated image currently displayed by the first user device.

2. The system of claim 1, wherein the operations further comprise:
determining the first bandwidth based on a signal to noise ratio of the communication path to the first user device.

3. The system of claim 1, wherein determining that the bandwidth availability of the communication path to the first user device has increased includes measuring latency of a connection between the first user device and the system.

4. The system of claim 1, wherein the non-animated image is received from a seller associated with a marketplace application.

5. The system of claim 1, wherein receiving the non-animated image includes receiving a highest quality version of the non-animated image as part of a process of establishing an electronic auction online, the non-animated image including a still image of an item for sale at a website associated with the system.

6. The system of claim 1, wherein the updated higher quality version of the non-animated image is an intermediate quality and intermediate size version of the non-animated image.

7. The system of claim 1, wherein a high bandwidth range included in the plurality of bandwidth ranges has a lower bound of 1.51 megabits per second (Mbps) and an upper bound of 247 Mbps.

8. A method, comprising:
  receiving a still image for display on a web page via a web client operating at an end-user device;
  receiving, at a server system, a request for web content from a first user device, the web content including the still image;
  in response to receiving the request for the web page:
    determining, by the server system, an initially available bandwidth for the first user device; and
    determining a necessary bandwidth associated with transmission of the still image as a function of the display size of the still image; and
  determining, based on comparing the determined initially available bandwidth and the necessary bandwidth, that the still image requires a greater bandwidth than is available;
  in response to determining that the still image requires a greater bandwidth than is available, assigning respective transmissions of a plurality of lower quality versions of the still image to one or more bandwidth ranges of a plurality of bandwidth ranges for transmission to user devices for display, wherein respective ones of the plurality of bandwidth ranges comprise an upper and a lower bound;
  selecting, based on comparing the initially available bandwidth with the plurality of bandwidth ranges, the transmission of one of the plurality of lower quality versions of the still image for the web content;
  transmitting to the first user device in response to the request for web content, all display elements for displaying the web content, the display elements including the transmission of the selected lower quality version of the still image;
  determine an updated bandwidth for the first user device, the updated bandwidth determined in response to a user interaction with the web content corresponding to a physical action taken via a user interface of the first user device and after the selected one of the plurality of lower quality versions of the still image are displayed by the first user device; and
  in response to determining that the updated bandwidth exceeds a threshold, transmitting a higher quality still image to the first user device, the higher quality still image being a larger byte size version of the lower quality version of the still image already displayed by the first user device.

9. The method of claim 8, wherein the higher-quality still image is a highest quality and largest size version of the still image at the server system.

10. The method of claim 8, wherein determining the updated bandwidth for the first user device includes measuring latency of a connection between the first user device and the server system.

11. The method of claim 8, wherein receiving the still image includes:
  receiving a highest quality version of the still image at the server system from the end-user device as part of a process of establishing an electronic auction online, the still image including an image of an item for sale at a website associated with the server system.

12. The method of claim 8, wherein the first user device is a smart phone.

13. The method of claim 8, wherein determining the initially available bandwidth for the first user device is based on a bi-directional measurement covering each direction between the server system and the first user device.

14. The method of claim 8, wherein the higher quality still image is an intermediate quality and intermediate size version of the still image at the server system.

15. The method of claim 8, wherein determining the initially available bandwidth for the first user device is based on a strength of wireless signal for the first user device.

16. A non-transitory computer-readable storage medium having instructions thereon that are executable by a computer system to cause the computer system to perform operations comprising:
  receiving a non-animated image for display on a web page via a web client operating at an end-user device;
  receiving a web page request from a first user device for a web page, the web page including the non-animated image;
  in response to receiving the web page request:
    based on a signal to noise ratio for a wireless connection of the first user device, determining a first bandwidth of a communication path to the first user device; and
    determining a necessary bandwidth associated with transmission of the non-animated image as a function of the display size of the non-animated image; and
  determining, based on comparing the first bandwidth and the necessary bandwidth, that the non-animated image requires a greater bandwidth than is available;
  in response to determining that the non-animated image requires a greater bandwidth than is available, assigning respective transmissions of a plurality of lower quality versions of the non-animated image to one or more bandwidth ranges of a plurality of bandwidth ranges for transmission to user devices for display, wherein respective ones of the plurality of bandwidth ranges comprise an upper and a lower bound;
  selecting, based on comparing the first bandwidth of the communication path with the plurality of bandwidth ranges, the transmission of one of the plurality of lower quality versions of the non-animated image for the web page;
  transmitting display elements to display the web page to the first user device, the display elements including the transmission of the selected lower quality version of the non-animated image;
  determining, in response to a user interaction with the web page corresponding to a physical action taken via a user interface of the first user device, an increase in the bandwidth available to the first user device; and
  in response to determining that the bandwidth available to the first user device has increased, causing an update to an existing display of the web page on the first user device by transmitting an updated higher quality version of the non-animated image to the first user device for display in place of the lower quality version of the non-animated image currently displayed by the first user device.

17. The non-transitory computer-readable storage medium of claim 16, wherein receiving the non-animated image includes receiving a highest quality version of the non-animated image as part of a process of establishing an electronic auction online, the non-animated image including a still image of an item for sale at a website associated with the computer system.

18. The non-transitory computer-readable storage medium of claim 16, wherein the updated higher quality version of the non-animated image is an intermediate quality and intermediate size version of the non-animated image.

19. The non-transitory computer-readable storage medium of claim 16, wherein determining that the bandwidth availability of the communication path to the first user device has increased includes measuring latency of a connection between the first user device and the computer system.

20. The non-transitory computer-readable storage medium of claim 16, wherein a low bandwidth range included in the plurality of bandwidth ranges has a lower bound of 0 kilobytes per second (kbps) and an upper bound of 128 kbps.

* * * * *